Sept. 20, 1949.  W. JONES  2,482,713
ROTARY INTERNAL GEAR PUMP
Filed June 27, 1944
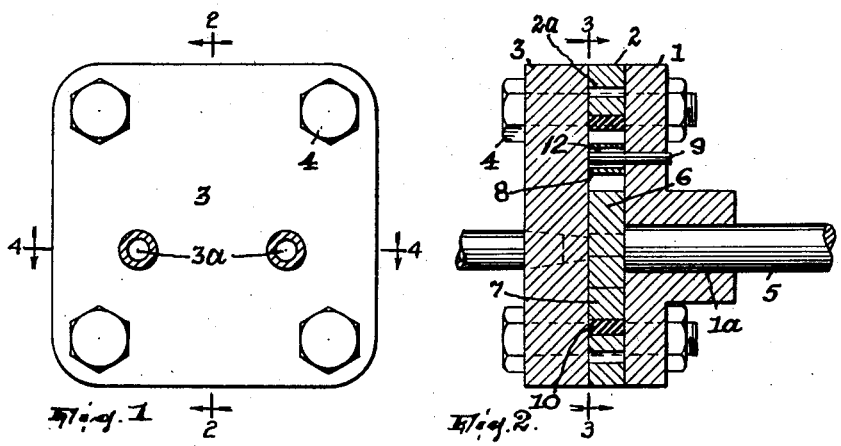
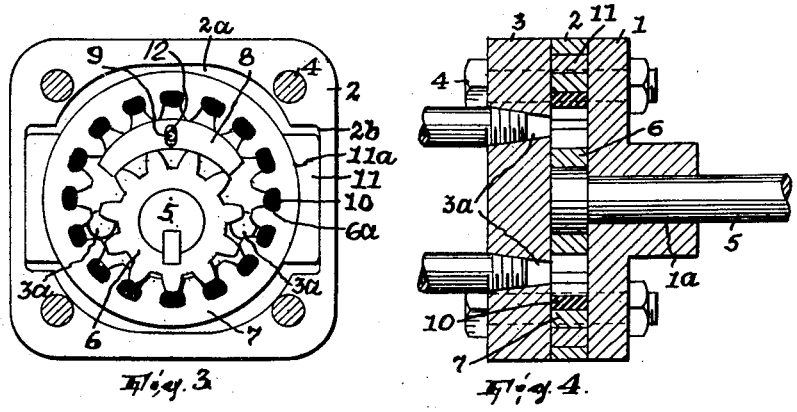
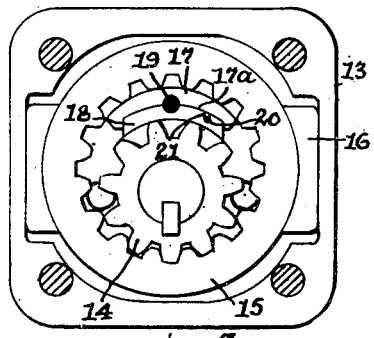
INVENTOR,
Walter Jones,
BY
John W. Seward,
ATTORNEY.

Patented Sept. 20, 1949

2,482,713

UNITED STATES PATENT OFFICE 2,482,713

ROTARY INTERNAL GEAR PUMP

Walter Jones, Teaneck, N. J., assignor, by mesne assignments, to Bergen Engineering and Sales Corporation, Hackensack, N. J., a corporation of New Jersey Application June 27, 1944, Serial No. 542,312

7 Claims. (Cl. 103—126)

A known type of rotary liquid pump includes, with a suitable housing having input and output ports, a pair of rotary intermeshing gears as impellers and arranged in the housing in eccentric relation to each other and in the same plane, one gear having external perimetrical teeth and the other being of greater internal diameter than and surrounding the first gear and having internal perimetrical teeth in mesh with the teeth of the first gear, and it is also known to provide a crescent-shaped barrier in the similarly shaped space between the gears. Usually the externally toothed or contained gear is the driving gear. When the pump is operating, the gears rotating, the liquid is transferred from the input to the output side of the barrier primarily as an incident of its occupying the spaces between the teeth of the gears and in that state caused to pass the barrier at both sides thereof.

The present invention consists in certain improvements in this type of pump. One salient feature of the improved pump involves obstructing transfer of the liquid from one to the other of the input and output sides except as such transfer is effected as above set forth, or primarily as an incident of the liquid occupying the spaces between the teeth of the gears and in that state being impelled by the barrier. Another salient and novel feature is indicated as follows: Whichever is the driving gear (in the examples to be set forth being the contained gear) the other may be a floating gear in the sense that it is movable lengthwise of a plane coincident with the axes of the gears, for which purpose the idle gear is engaged at both sides of said plane by bearing members slidable in the pump housing parallel with said plane.

The manner in which the said sealing off of the input from the output side may be effected is herein illustrated in two forms.

In the drawing,

Fig. 1 is a front view of one form of the improved pump;

Fig. 2 is a section on line 2—2 of Fig. 1;

Fig. 3 is a section on line 3—3 of Fig. 2;

Fig. 4 is a section on line 4—4 of Fig. 1; and

Fig. 5 is a view like Fig. 3 and showing the other form of the pump.

A case or housing is in the present example formed by plates or walls 1, 2 and 3 held in laminated state by bolts 4, the back wall 1 having a bearing bore 1a, the intermediate wall 2 an aperture 2a and the front wall 3 ports 3a either of which may be the input and the other the output port. The walls are in face to face relation to each other so that aperture 2a becomes an inclosed space with which the ports communicate. Wall 2 is of uniform thickness.

A shaft 5 is journaled in the bearing bore and in said space of the housing it has keyed thereto, a gear 6 having its perimeter toothed. Surrounding this gear is an annular gear 7 of appreciably greater internal diameter than the diameter of gear 6 and having its inner perimeter toothed. To provide a sealing contact between each gear and the walls 1 and 3, circumferentially of each gear, the latter may be of the same thickness as that of wall 2. Gear 6 is the driving gear and 7 the idle gear.

Contained in the crescent-shaped space between the gears is a barrier 8 of generally crescent shape, but truncated at both ends, whose concave and convex surfaces are respectively contacted by the gears 6 and 7, wherefore gear 7 is eccentric of gear 6 and is further confined to intermeshing relation therewith as for a portion of the perimeter of each gear. The barrier, which is also of such thickness as to provide sealing contact with walls 1 and 3, is confined against rotative displacement by the gears by a pin 9 projecting into the barrier and extending from wall 1.

In the notch between each two teeth of the gear 7 is arranged an elastic plastic cushion 10, as of rubber, in this example actually acting as a seal, being held in the notch in any way as by its being of such normal form, and say cylindrical, as to require to be deformed when entered between the teeth and by the bottom portions of the notch being enlarged, as at 6a. Each cushion is at least to obstruct flow from any notch to the next notch of either gear but preferably it is of such dimension lengthwise of the axes of the gears that, at least when it undergoes compression, its ends will wipe the inner faces of walls 1 and 3 so that it acts as a seal. With gear 7 held in eccentric relation to gear 6 by the barrier 8, those cushions 10 which occupy the notches between teeth of gear 7 that at any time mesh with teeth of gear 6 are held in a state of compression, thus to function as seals and prevent flow via the space otherwise existing between such teeth of the gears.

As will appear, gear 7 is susceptible of displacement in its own plane. But in any event the construction is such that whether the direction of rotation of the gears be clockwise or anti-clockwise the following conditions exist when the gears are rotated: Assume that the direction of rotation is clockwise, in which case the input and output ports would respectively be the left-hand and right-hand ports 3a in Fig. 3. Flow, as leakage, cannot take place anti-clockwise where the gears intermesh because of the seals. The flow proceeds, in this case clockwise, in the region diametrically opposite to that where the gears intermesh, the liquid occupying the notches of the gears; leakage reversely in this region will be completely prevented if, as shown, the ends of the teeth of gears 6 and 7 respectively wipe the concave and convex surfaces of the barrier 8.

In the preferred form, as indicated, the gear 7 is displaceable in its own plane, to wit, in coincidence with a plane coinciding with its axis and cutting the intermeshing segments of the gears substantially centrally. For this purpose the aperture 2a is of such area as to permit this displacement (Fig. 3) and said gear is confined to rectilinear displacement by bearing elements 11 having bearing surfaces 11a conforming with the circular outer perimeter of said gear and slidable in guideways 2b of said aperture: further, the barrier 8, where it is penetrated by the pin 9, is formed with a slot 12. By this arrangement the ends of the teeth of the gears are held constantly, by the seals at any time in a state of compression, in contact with the adjoining surfaces of the barrier so that, notwithstanding wear, the barrier coacts with the gears to prevent leakage past the barrier reversely to the direction of rotation.

The gears being eccentric with some barrier between them, a primary object in view of the foregoing is to seal off from each other the input and output ports so that the flow may only be by propulsion from the input to the output port and as per the direction of rotation of the gears, that is to say, to maintain such sealing where the gears intermesh and in the diametrically opposite region, in the latter case between some barrier which maintains the gears in mesh and each gear. For this purpose the construction may be as in Fig. 5 (where, again, it is not indispensable that one gear is displaceable in its own plane, although it is so shown):

The housing 13, gears 14 and 15 (gear 15 being displaceable the same as gear 7) and the bearing elements 16 are all the same as the corresponding parts already described excepting that the teeth of the two gears where they intermesh are assumed to coact to form a seal, as by the ends of the teeth of at least one gear abutting the bottoms of the notches of the other from wall 1 to wall 3. The barrier is in this example in two parts 17 and 18 together having the generally crescent form, or concave at the side adjoining gear 14 and convex at the side adjoining gear 15. One part, as 17, has a recess 17a receiving the other which confines the latter against relative rotary displacement while permitting the parts to move apart in a plane coinciding with the axis of gear 14 and cutting the intermeshing segments of the gears substantially centrally. These parts are normally urged apart in coincidence with said plane by an elastic cushion, as 19, occupying a socket, which they together provide and by hydraulic pressure between them. The barrier is held against rotative displacement by a fixed pin 20 penetrating a slot 21 in part 18.

Either gear may of course be the driving gear; though if one is displaceable in its own plane the other will usually be the driving gear.

Having thus fully described my invention, what I claim is:

1. The combination, with a rotary gear having an outer toothed perimeter, an annular rotary gear of greater internal diameter than and surrounding the first gear and having its inner perimeter toothed and in mesh with the toothed perimeter of the first gear, one gear being a driving gear and the other an idle gear, a barrier occupying the crescent-shaped space between the gears and isolating one end portion of said space from the other and having surfaces in wiping contact with the series of teeth of the respective gears, and bearing members engaging the outer perimeter of the idle gear at portions thereof both sides of a plane coincident with the axes of the gears, of a housing containing the parts formed by said gears, barrier and bearing members and in which the driving gear is journaled and having ports leading to said end portions of said space and also having walls respectively coacting with said parts to seal off liquid flow between each wall and each such part, said housing having guideways for the bearing members extending parallel with said plane.

2. The combination, with a rotary gear having an outer toothed perimeter, an annular rotary gear of greater internal diameter than and surrounding the first gear and having its inner perimeter toothed and in mesh with the toothed perimeter of the first gear, one gear being a driving gear and the other an idle gear, a barrier occupying the crescent-shaped space between the gears and isolating one end portion of said space from the other and having surfaces in wiping contact with the series of teeth of the respective gears, bearing members engaging the outer perimeter of the idle gear at portions thereof both sides of a plane coincident with the axes of the gears, and elastic means constantly maintaining the toothed perimeters of the gears and the respective surfaces of the barrier in wiping contact with each other, of a housing containing the parts formed by said gears, barrier, bearing members and means and in which the driving gear is journaled and having ports leading to said end portions of said space and also having walls respectively coacting with said parts to seal off liquid flow between each wall and each such part, said housing having guideways for the bearing members extending parallel with said plane.

3. The combination, with a rotary gear having an outer toothed perimeter, an annular rotary gear or greater internal diameter than and surrounding the first gear and having its inner perimeter toothed and in mesh with the toothed perimeter of the first gear, one gear being a driving gear and the other an idle gear, a barrier occupying the crescent-shaped space between the gears and isolating one end portion of said space from the other and having surfaces in wiping contact with the series of teeth of the respective gears, bearing members engaging the outer perimeter of the idle gear at portions thereof both sides of the plane coincident with the axes of the gears, said idle gear and bearing members being movable in parallelism with said plane, and elastic plastic cushions occupying the spaces between the several teeth of one gear and arranged to be abutted by the teeth of the other gear, of a housing containing the parts formed by the gears, barrier and bearing members and having ports leading to said end portions of said space and also having walls respectively coacting with said parts to seal off liquid flow between each wall and each such part, said housing having guideways for the bearing members extending parallel with said plane.

4. The combination, with a rotary gear having an outer toothed perimeter, an annular rotary gear of greater internal diameter than and surrounding the first gear and having its inner perimeter toothed and in mesh with the toothed perimeter of the first gear, one gear being a driving gear and the other an idle gear, a barrier occupying the crescent-shaped space between the gears and isolating one end portion of said space from the other and including elements in wiping contact with and movable toward the series of teeth of the respective gears, bearing members engaging the outer perimeter of the idle gear at portions thereof both sides of a plane coincident with the axes of the gears, said idle gear and the bearing members being movable in parallelism with said plane, and an elastic cushion between and urging apart said elements of the barrier, of a housing containing the parts formed by the gears, barrier and bearing members and having ports leading to said end portions of said space and also having walls respectively coacting with said parts to seal off liquid flow between each wall and each such part, said housing having guideways for the bearing members extending parallel with said plane.

5. The combination, with a rotary gear having an outer toothed perimeter, an annular rotary gear of greater internal diameter than and surrounding the first gear and having its inner perimeter toothed and in mesh with the toothed perimeter of the first gear, one gear being a driving gear and the other an idle gear, a barrier occupying the crescent-shaped space between the gears and isolating one end portion of said space from the other and having surfaces in close relation to the series of teeth of the respective gears, and elastic cushions occupying the spaces between the several teeth of one gear and arranged to be abutted by the teeth of the other gear, of a housing having the driving gear journaled therein and containing the parts formed by the gears and barrier and having ports leading to said end portions of said space and also having walls respectively coacting with said parts to seal off liquid flow between each wall and each such part.

6. The combination, with a driven rotary gear having an outer toothed perimeter, an annular idle rotary gear of greater internal diameter than and surrounding the first gear and having its inner perimeter toothed and in mesh with the toothed perimeter of the first gear, a barrier occupying the crescent-shaped space between the gears and isolating one end portion of said space from the other and having surfaces in wiping contact with the series of teeth of the respective gears, and bearing members engaging the outer perimeter of the idle gear at portions thereof both sides of a plane coincident with the axes of the gears, of a housing containing the parts formed by said gears, barrier and bearing members and in which the driving gear is journaled and having ports leading to said end portions of said space and also having walls respectively coacting with said parts to seal off liquid flow between each wall and each such part, said housing having guideways for the bearing members extending parallel with said plane.

7. The combination, with a driven rotary gear having an outer toothed perimeter, an annular idle rotary gear of greater internal diameter than and surrounding the first gear and having its inner perimeter toothed and in mesh with the toothed perimeter of the first gear, a barrier occupying the crescent-shaped space between the gears and isolating one end portion of said space from the other and having surfaces in wiping contact with the series of teeth of the respective gears, bearing members engaging the outer perimeter of the idle gear at portions thereof both sides of a plane coincident with the axes of the gears, and elastic means constantly maintaining the toothed perimeters of the gears and the respective surfaces of the barrier in wiping contact with each other, of a housing containing the parts formed by said gears, barrier, bearing members and means and in which the driving gear is journaled and having ports leading to said end portions of said space and also having walls respectively coacting with said parts to seal off liquid flow between each wall and each such part, said housing having guideways for the bearing members extending parallel with said plane.

WALTER JONES.

REFERENCES CITED

The following references are of record in the file of this patent:

UNITED STATES PATENTS

| Number | Name | Date |
|---|---|---|
| 1,442,828 | Rotermund | Jan. 23, 1923 |
| 1,604,802 | Brenzinger | Oct. 26, 1926 |
| 1,646,615 | Furness | Oct. 25, 1927 |
| 1,968,113 | Weaver | July 31, 1934 |

FOREIGN PATENTS

| Number | Country | Date |
|---|---|---|
| 386,591 | Great Britain | Jan. 19, 1933 |